(No Model.) 2 Sheets—Sheet 2.
G. VALENTINE.
GATE.
No. 421,788. Patented Feb. 18, 1890.
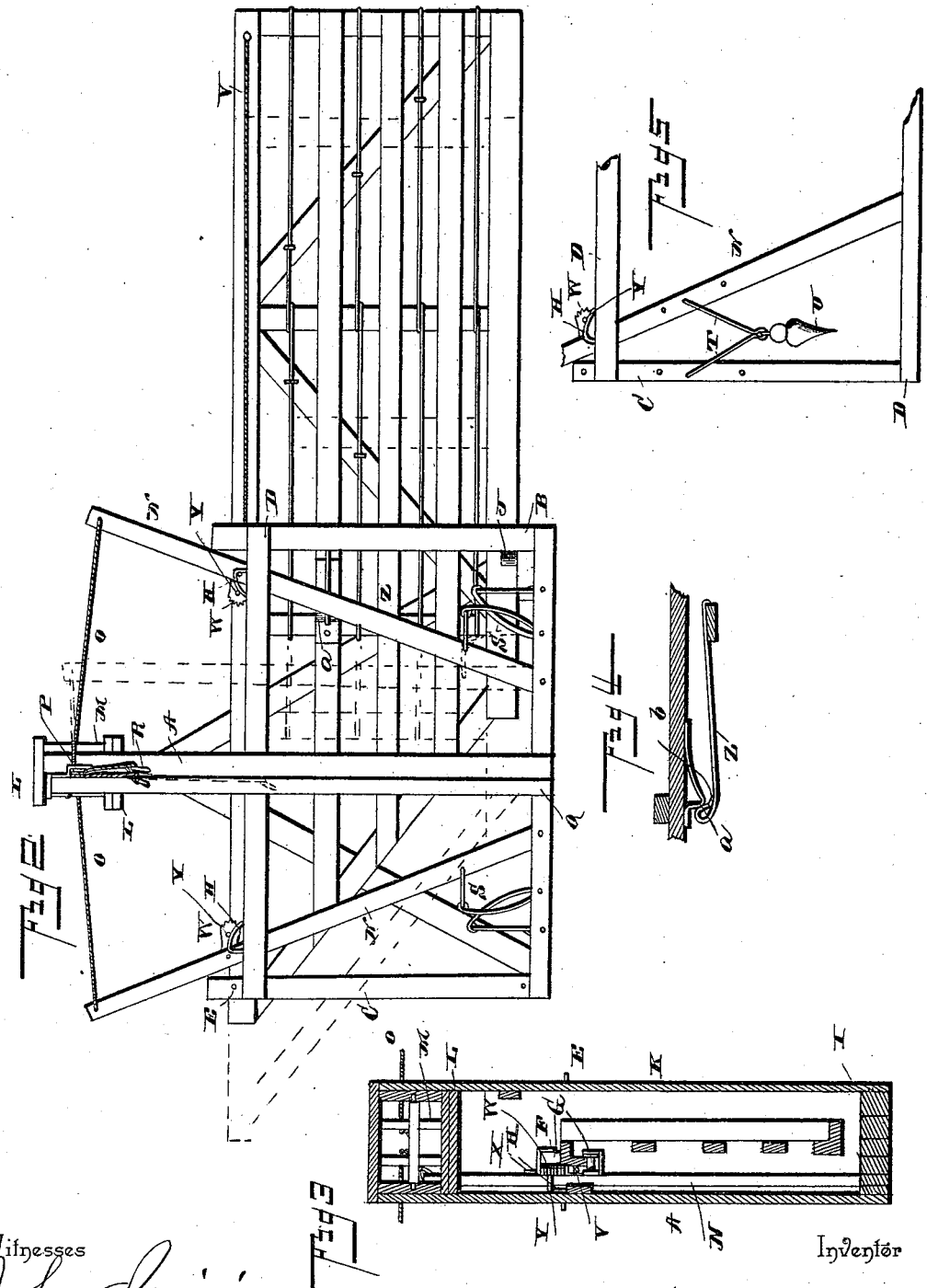
Witnesses
John Imirie
Inventor
George Valentine
By his Attorneys,
R. W. Bishop
C. A. Snow & Co.

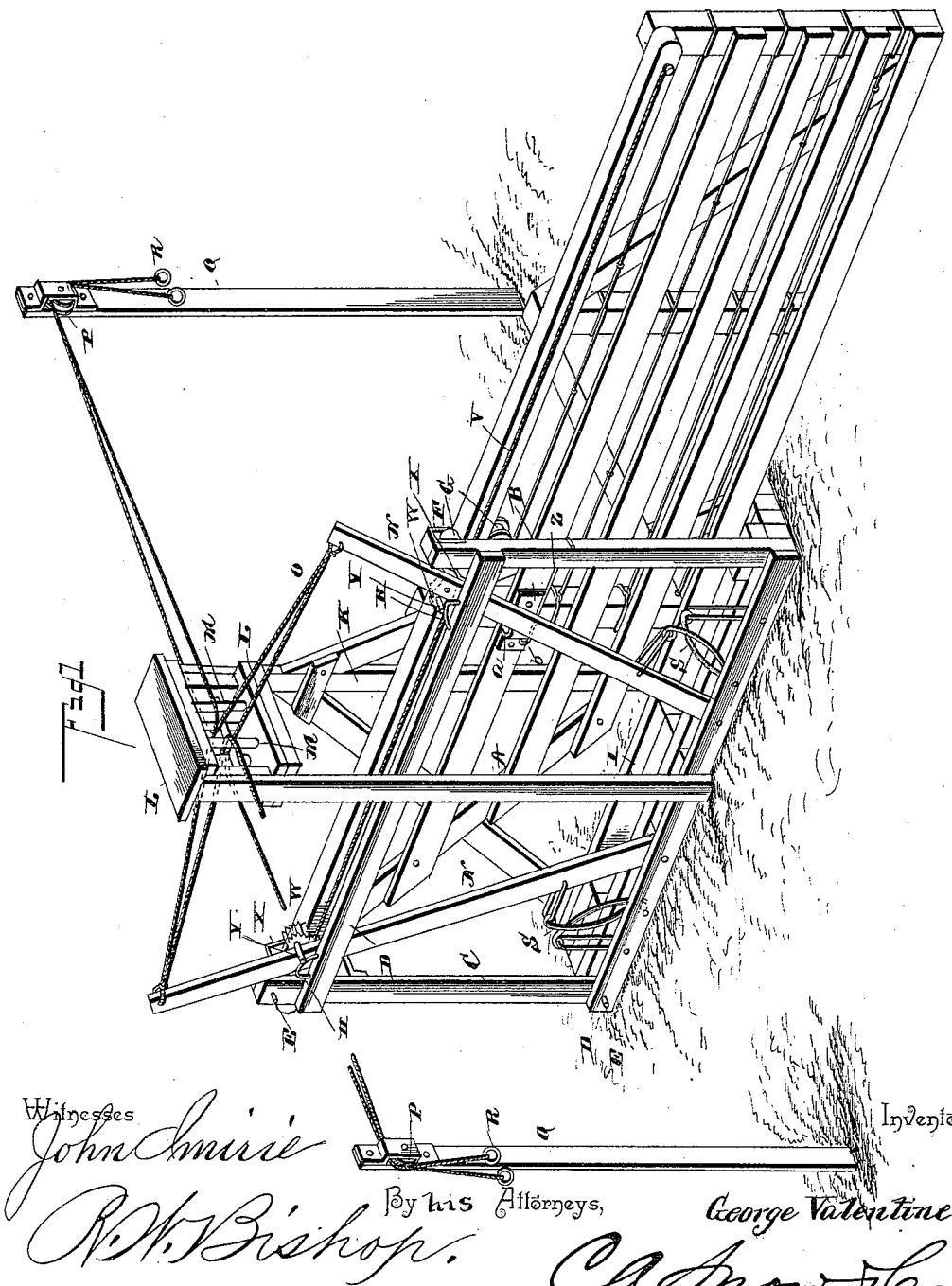

UNITED STATES PATENT OFFICE.

GEORGE VALENTINE, OF MONTICELLO, ILLINOIS, ASSIGNOR OF ONE-HALF TO FRANK L. FARRA, OF SAME PLACE.

GATE.

SPECIFICATION forming part of Letters Patent No. 421,788, dated February 18, 1890.

Application filed October 10, 1889. Serial No. 326,559. (No model.)

*To all whom it may concern:*

Be it known that I, GEORGE VALENTINE, a citizen of the United States, residing at Monticello, in the county of Piatt and State of Illinois, have invented a new and useful Gate, of which the following is a specification.

My invention relates to improvements in gates; and it consists in certain novel features, hereinafter described and claimed.

In the accompanying drawings, Figure 1 is a perspective view of my improved gate. Fig. 2 is a side view of the same, showing the manner of operating the gate. Fig. 3 is a vertical section. Fig. 4 is a horizontal section. Fig. 5 is a detail view of a modification.

In carrying out my invention I employ a supporting-frame, which consists of the posts A B C and the bars D, connecting the said posts. The said frame is provided with the laterally-projecting bolts E, which are adapted to be inserted through the fence-posts, and thereby secure the gate in its proper position.

On the outer side of the posts B C, at and near the upper ends of the same, I secure the brackets F, in which the rollers G are mounted, and the gate is supported by and travels on these rollers.

On the upper edge of the upper bar D, I secure the triggers H, the purpose of which will presently appear. A sill I is secured to the outer side of the lower bar D, and on this sill, adjacent to the post B, I mount the vertically-disposed roller J, against which the gate bears in its movements. A post K is secured to this sill I and extends upward therefrom, and is connected to the post A by the cross-plates L L, as shown. Between these cross-plates L, I arrange a series of guide pins or rollers M, and the operating cords or ropes pass between and around said pins or rollers.

Between the lower cross-bar D and the sill I, I pivot the vibrating levers N, and to the upper ends of these levers I secure the ropes O, which pass from the said levers to and between the pins or rollers M, and thence outward to and over the pulleys P at the upper ends of the pulley-posts Q, which are set in the ground at the proper distance from the gate. The ends of these ropes O are provided with rings R, so that they may be easily grasped by the operator to manipulate the gate. It will be observed that two ropes are secured to each lever, and that these ropes extend to the opposite pulley-posts, so that one rope may be drawn upon to open the gate and the other rope used to close the gate.

Adjacent to the lower ends of the levers I arrange the springs S, which have one end connected with the lever and the other end connected with the sill. When the levers are drawn from their normal position to open or close the gate, the springs will be distended, so that upon releasing the operating-ropes the springs will at once restore the levers to their initial position.

Instead of the springs, I may employ the rods T, flexibly connected and having their outer ends pivoted to the levers and the supporting-frame. At the joints of these rods I hang thereon a weight U, which draws the said rods downward, and thereby serves to hold the levers in their initial positions.

A rope or chain V is secured to and extends along the upper rail of the gate, and this rope or chain is engaged by the friction clamps or dogs W, which are pivoted on the levers within the brackets X, through which the rope or chain passes, and are adapted to engage the rope and bind it against the bracket. The dog W is provided with a lateral pin or arm Y, which rides over the trigger H, and is thereby held out of engagement with the rope or chain when the lever is at rest. The dog W is further provided on its edge with ratchet-teeth, which are so shaped as to engage the rope or chain when the lever is drawn inward by the operating-rope, but will ride over the said rope or chain when the lever is being returned to its normal position.

On the post B, I secure a spring-latch Z, which extends inward therefrom and is adapted to engage a shoulder *a* on the gate, and has its free end bent inward to provide the inclined portion *b*, as shown. This latch normally projects outward away from the gate, but is pressed into engagement with the shoulder *a* by the adjacent lever N, as will be understood on reference to Fig. 4. When this lever is vibrated to open the gate, the spring-latch at once disengages itself from the shoulder on the gate, and thereby allows the gate to slide.

From the foregoing description, taken in connection with the accompanying drawings, it will be seen that I have provided a gate which is compactly arranged, is composed of few parts, and is strong and durable, and the operation and advantages of the same are thought to be obvious. A person approaching the gate on horseback or in a vehicle draws downward on the end of the proper rope, and thereby vibrates the forward lever N to throw the dog thereon into engagement with the rope or chain V, and as the lever continues its motion it will draw on the said rope or chain, so as to half-way or partially open the gate, after which a second pull is given the operating rope or chain, and the lever N, having been previously returned to its normal position through its spring S, is given a second vibration, at the beginning of which its dog W takes a new grip upon the rope or chain V, and the gate is thrown to a completely-open position. Just before the dog on the lever engages the rope or chain V, the spring-latch will be released from the gate, so that the movement of the gate will not be interrupted. The team is then driven through the gate, and the rope on the opposite side drawn on to close the gate, as will be readily understood. When the inner lever N is in its normal position and the gate closed, said lever is opposite and compresses said latch until its engaging end $b$ is in the path of the shoulder $a$ of the gate, so that if the gate should not be completely closed animals cannot wedge themselves between the gate-post and gate, and thus partially open the gate and pass therethrough.

Having thus described my invention, what I claim, and desire to secure by Letters Patent, is—

1. The combination of the gate, the vibrating levers, clutches mounted on the levers and adapted automatically to grip the gate, and mechanism for operating said levers, as set forth.

2. The combination of the gate, the rope or chain extending along the upper edge of the gate, the vibrating levers carrying dogs adapted to engage said rope or chain, and mechanism for vibrating the levers, as set forth.

3. The combination of the gate, the vibrating levers carrying brackets, the dogs pivoted in said brackets, the rope or chain passing through the brackets and engaged by the dogs, the operating-ropes secured to the levers at their upper ends, and the springs connected with levers near their lower ends, as set forth.

4. The combination of the frame having the triggers H on its upper edge, the gate, the rope or chain V, secured to the gate, the levers, the dogs pivoted on the levers and adapted to engage the said rope and having lateral pins adapted to engage the triggers, and mechanism for vibrating the levers, as set forth.

5. The combination of the gate having the shoulder $a$, the post arranged at one side of the gate, the spring-latch mounted on the post and having a tendency to remain out of contact with the shoulder, and the lever adapted to open the gate and when not in operation to press the said latch into engagement with the shoulder, as set forth.

6. In combination with the sliding gate having the rope or chain V, the vertically-inclined vibrating levers N, pivoted at their lower ends, the dogs W, carried by the levers and adapted to engage the rope or chain, a weight or spring to return the levers to their former positions, and operating-ropes connected to each of the vibrating levers, as set forth.

In testimony that I claim the foregoing as my own I have hereto affixed my signature in presence of two witnesses.

GEORGE VALENTINE.

Witnesses:
  OWEN H. HUDGEN,
  H. E. KAISER.